May 6, 1958

I. H. GERKS 2,833,922

STEPPED ELECTRICAL FEEDBACK SERVO MEANS

Filed Oct. 21, 1955

INVENTOR.
IRVIN H. GERKS
BY Moody and Goldman
ATTORNEYS

May 6, 1958     I. H. GERKS     2,833,922
STEPPED ELECTRICAL FEEDBACK SERVO MEANS
Filed Oct. 21, 1955     2 Sheets-Sheet 2
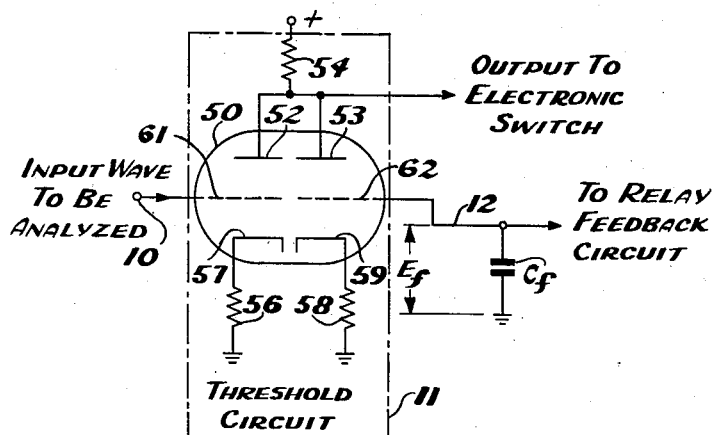
FIG 2
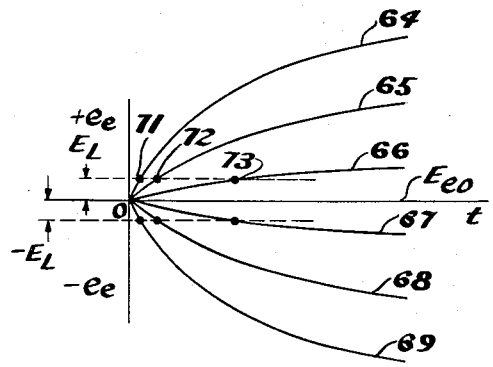
FIG 3
FIG 4
INVENTOR.
IRVIN H. GERKS
BY Moody and Goldman
ATTORNEYS United States Patent Office 2,833,922
Patented May 6, 1958

2,833,922

STEPPED ELECTRICAL FEEDBACK SERVO MEANS

Irvin H. Gerks, Cedar Rapids, Iowa, assignor to Collins Radio Company, Cedar Rapids, Iowa, a corporation of Iowa Application October 21, 1955, Serial No. 541,980

7 Claims. (Cl. 250—27)

This invention relates generally to servo systems having electrical feedback and relates particularly to a servo system that utilizes a stepped feedback voltage.

The invention may be used to regulate a sequence of electrical pulses according to their integrated value, wherein a novel feedback arrangement is provided to regulate the pulse sequence. The feedback voltage is controlled by the invention in a manner that prevents overshoot, oscillation, or hunting of the regulated signal while it is being readjusted to provide the required integrated value.

This invention has particular use in the servo loop of an amplitude distribution analyzer of the type described in another patent application of the present inventor having Serial Number 368,923, filed July 20, 1953, and titled "Amplitude Distribution Analyzer," now Patent No. 2,779,869 dated January 29, 1957.

Briefly, the amplitude distribution analyzer is used to analyze randomly varying signals and determines what signal amplitude is being exceeded a given percentage of the time. Reference is made to the above cited application for a generic analysis of the amplitude distribution analyzer.

Overshoot is not permissible in the servo loop of an amplitude distribution analyzer, because overshoot causes substantial error in the measured indication of the analyzer. Accordingly, the invention is particularly well suited for use in an amplitude distribution analyzer, since substantially all overshoot and hunting are avoided due to the feedback arrangement of the invention.

The present invention can be used in systems other than an amplitude distribution analyzer. Accordingly, it may be used wherever a regulated voltage is required across a low-pass filter.

Furthermore, the invention may be used to regulate any one of a number of characteristics of a pulsed wave, and can be used to regulate any one of the characteristics: Pulse-repetition-rate, pulse-amplitude, or pulse-width, provided that the remaining two characteristics are regulated by other means. For example, where the invention is used to control pulse-repetition-rate, the pulse-amplitude and pulse-width should be previously stabilized to constant values by other means. Then, the integrated value of the pulses is only proportional to the pulse-repetition-rate. Hence, by maintaining the integrated value at a constant value, the repetition-rate is maintained constant.

A feature of the invention is a switching system that intermittently samples the error-signal by switching it to zero and sensing its rise-time to a predetermined voltage. The invention uses the rise-time of the error-signal to control a relay system that shapes the feedback voltage, which is obtained from external direct-voltage sources. The feedback voltage is a step function of time; and the amplitude and duration of each step are selectively controlled by the relay system and its associated circuitry.

Further objects, features, and advantages of this invention will be apparent to a person skilled in the art upon further study of the specification and drawings, in which:

Figure 2 shows one type of threshold circuit that may be used in the system of Figure 1;

Figure 3 shows a series of curves that illustrate feedback voltage rise-time characteristics; and, Figure 4 illustrates the variation of feedback voltage.

Figure 1:
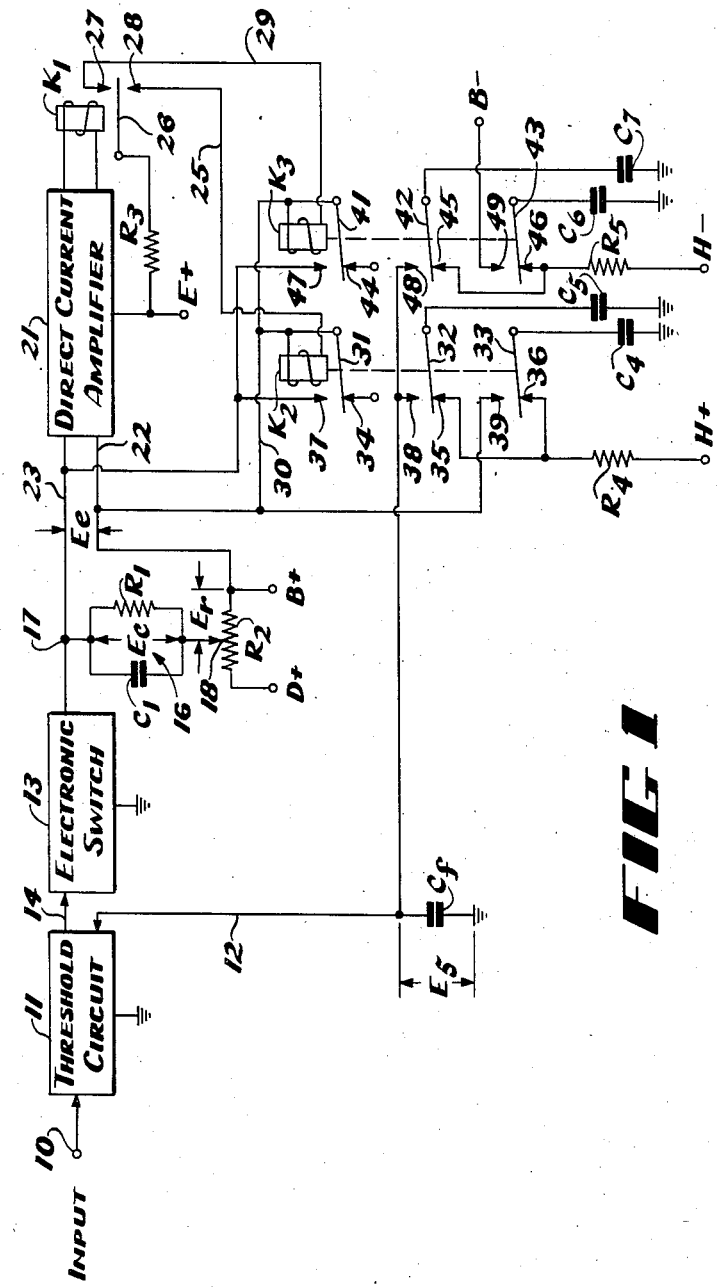
Figure 1 illustrates one form of the invention.

Now referring to the invention in more detail. Figure 1 shows how the invention may be used in an amplitude distribution analyzer circuit. An input wave is received at terminal 10; and the wave is presumed to be a varying direct-voltage, that might, for example, vary in proportion to the fading of radiation received by an antenna. A threshold circuit 11 regulates the direct-voltage component of the received signal, although it may provide amplification of the alternating-signal component. The direct-voltage component in threshold circuit 11 is regulated by a servo-feedback-voltage received from lead 12. This feedback-voltage will be described later in detail.

An electronic switch 13 has its input connected by a lead 14 to the output of threshold circuit 11. Electronic switch 13 is a pulse generating device that generates pulses having constant amplitude in response to the threshold circuit signal. For example, the electronic switch might be a type of multivibrator with an output, which is actuated to a conducting state when a given voltage, called the threshold level, is exceeded by the input signal and is actuated to a non-conducting state when the input signal falls below the threshold level. Accordingly, the direct-voltage component of the threshold circuit output signal is varied by the feedback voltage to control the average widths of the pulses formed in the electronic switch. The output pulses of electronic switch 13 then have periods equal to the varying periods of time that the input signal exceeds the threshold level. The output of electronic switch 13 is maintained at a constant amplitude that may be regulated by constant-current pentode means or by diode clamping means, for example.

An integrator circuit 16 is connected at point 17 to the output of electronic switch 13. Integrator circuit 16 comprises a capacitor $C_1$ and a resistor $R_1$, which, in effect, are a low-pass filter having a very large time-constant. The other side of integrator circuit 16 is connected to a tap 18 of a potentiometer $R_2$ which is connected between the positive direct-voltage sources, B plus and D plus, wherein voltage D plus is greater than voltage B plus.

A direct-current amplifier 21 has a lower input lead 22 connected to the B plus source and an upper lead 23 connected to the integrator circuit at point 17. Direct-current amplifier 21 is also connected to another direct-voltage source, E plus, which provides the power necessary for amplifier operation.

A polarized relay $K_1$ is connected across the output terminals of direct-current amplifier 21 and has a single pole 26 with a pair of opposite contacts 27 and 28. Relay $K_1$ is of such type that, when de-energized, pole 26 is in an off-position and does not engage either contact 27 or 28. However, when the relay is energized with one polarity of current, pole 26 engages upper contact 27; and when relay $K_1$ is energized by the opposite current polarity, pole 26 then engages lower contact 28.

A current-limiting resistor $R_3$ connects the E plus direct-voltage source to relay 26.

Another pair of relays $K_2$ and $K_3$ are provided, each having three poles. Relay $K_2$ has poles 31, 32 and 33; and when relay $K_2$ is not energized, its poles respectively engage lower contacts 34, 35, and 36. When energized, the poles respectively engage upper contacts 37, 38 and 39.

In a similar manner, relay $K_3$ has poles 41, 42 and 43 that engage lower contacts 44, 45 and 46 when not energized. And when relay $K_3$ is energized, its poles respectively engage upper contacts 47, 48 and 49.

The coil of relay $K_2$ is connected in series between the

B plus source and lower contact 28 of relay $K_1$. In a like manner, the coil of relay $K_3$ is connected between the B plus source and the upper contact 27 of relay $K_1$.

Poles 31 and 41 of relays $K_2$ and $K_3$ are connected in parallel so that each can short-circuit the input to direct-current amplifier 21. Accordingly, in Figure 1, poles 31 and 41 each connect to the lower input lead 22 of direct-current amplifier 21; while contacts 37 and 47 of relays $K_2$ and $K_3$ are connected together to upper input lead 23 of direct-current amplifier 21. Consequently, when either pole 31 or 41 engages its respective contact 37 or 47, the input to direct-current amplifier 21 is short-circuited.

A large capacitor $C_f$ is connected between ground and feedback input lead 12 to threshold circuit 11. Capacitor $C_f$ is also connected on its ungrounded side to contacts 38 and 48 of relays $K_2$ and $K_3$. A very small capacitor $C_5$, compared to capacitor $C_f$, is connected between ground and pole 32 of relay $K_2$; and a medium-sized capacitor $C_4$ is connected between ground and the remaining pole 33 of relay $K_2$. Capacitor $C_4$ may have a capacitance about ten times larger than capacitor $C_5$, while capacitor $C_f$ may have a capacitance about sixty times larger than capacitor $C_4$. Of course, wide variation in capacitor size is permissible to attain various designs of this invention. Contact 39 of relay $K_2$ is connected to the B plus source. Another resistor $R_4$ is connected at one end to a direct-voltage source, H plus, and is connected at its other end to contacts 35 and 36 of relay $K_2$.

In a similar manner, a capacitor $C_7$, which may be equal to capacitor $C_5$, is connected between ground and pole 42 of relay $K_3$. Another capacitor $C_6$, which may be equal to capacitor $C_4$, is connected between ground and pole 43 of relay $K_3$. A direct-voltage source, B minus, which has equal magnitude but opposite polarity to the B plus source, is conencted to contact 49 of relay $K_3$. A resistor $R_5$ is connected at one end to another direct-voltage source, H minus, which may be equal in magnitude but opposite in polarity to the H plus source. The other end of resistor $R_5$ connects to contacts 45 and 46 of relay $K_3$.

Figure 2 shows one type of circuit that may comprise threshold circuit 11. It uses a dual triode 50 which has its plates 52 and 53 connected together to one side of a plate resistor 54, that is connected on the other side to a positive direct-voltage plate source. Another resistor 56 connects between ground and one cathode 57; and still another resistor 58 connects between ground and other cathode 59.

The input wave provided to the amplitude distribution analyzer is received on grid 61. The other grid 62 receives the feedback voltage $E_f$ across capacitor $C_f$.

The feedback voltage $E_f$ on grid 62 controls the effective plate voltage on tube 50. This is because the feedback voltage controls the plate-current through the right-hand triode in Figure 2 to provide a component of direct-current through plate-resistor 54 which controls the direct-voltage drop across plate resistor 54. Thus, an increase in the positive direction of feedback-voltage $E_f$ will decrease the plate-voltage on the left-hand tube. In the same manner, a change in the negative direction of feedback-voltage $E_f$ will increase the plate-voltage of the left triode. The plate-voltage is the direct-current component of the threshold circuit output voltage. A substantially linear variation between feedback-voltage $E_f$ and the plate-voltage is preferred. Tube 50 is chosen so that variation in its plate-voltage does not substantially change the amplification of the alternating-component of the signal.

Accordingly, the pulse forming actuations of electronic switch 13 are controlled by varying the direct-voltage component of the input signal. Thus, when the direct-voltage component is small, the upper portions of the alternating component actuate electronic switch 13; and when the direct-voltage component is large, the lower portions of the alternating component actuate electronic switch 13. As stated above, pulses are formed by electronic switch 13 during the periods that portions of the alternating-component exceed the actuating level of electronic switch 13.

The pulsed output of electronic switch 13 has a constant amplitude and is provided to integrator circuit 16. If permitted to do so, integrator circuit 16 would charge to a steady-state direct-voltage $E_c$, that is proportional to the ratio of the totalized periods of the pulses over a given period of time divided by that given period of time. The given period of time is determined by the time-constant of integrator circuit 16.

In an amplitude distribution analyzer, the steady-state voltage $E_c$ of integrator circuit 16 is proportional to the amount of time that the input signal exceeds a given amplitude. See the above cited application.

The invention provides means, such as the threshold circuit and electronic switch, for regulating the input pulses to integrator circuit 16 so that it will be charged to a predetermined voltage, which is determined by the setting of tap 18 of potentiometer $R_2$. The direct-voltage between tap 18 and the B plus terminal is designated as reference voltage $E_r$. The servo system regulates the pulse input to integrator circuit 16 so that its charged voltage is maintained equal in magnitude to reference voltage $E_r$. In an amplitude distribution analyzer, voltage $E_r$ is used to designate a particular percentage of time that the input signal may exceed an adjustable threshold voltage level.

The polarity of the output pulses from electronic switch 13 is chosen to be negative, since reference voltage $E_r$ has positive polarity. Hence, integrator circuit 16 will charge to a steady-state negative voltage $E_c$. As a result when voltage $E_c$ and $E_r$ do not have equal magnitude, a difference voltage $E_e$ will be provided at the input terminals of direct current amplifier 21 and can be stated by the following formula:

$$E_e = E_r - E_c \quad (1)$$

Voltage $E_e$ is the error-voltage of the system. It will, therefore, be zero when integrator voltage $E_c$ equals reference voltage $E_r$, and may be either positive or negative according to whether error-voltage $E_c$ is less than or greater than reference voltage $E_r$.

The servo feedback system, which follows, has the purpose of regulating the pulsed input to the integrator circuit to maintain a zero error-voltage $E_e$ in the system.

When steady-state error-voltage $E_e$ is not zero, the relay system discharges the error-voltage to zero at time intervals computed automatically by the relay system. The intermittent discharges to zero error-voltage are accomplished by short-circuiting the input to direct-current amplifier 21 by actuation of either pole 31 or pole 41. During a short-circuit, integrator circuit 16 discharges to the level of reference-voltage $E_r$, thereby reducing error-voltage $E_e$ to zero.

The short-circuiting occurs only when error-voltage $E_e$ is other than zero; because error-voltage $E_e$ provides the actuating output, which is amplified by direct-current amplifier 21 to energize relay $K_1$. If error-voltage $E_e$ has one polarity, pole 26 will engage lower contact 28, while if error-voltage $E_e$ has the opposite polarity, pole 26 will engage upper contact 27.

When lower contact 28 of relay $K_1$ is engaged, relay $K_2$ is energized by a circuit from the E plus source through resistor $R_3$, pole 26, contact 28, lead 25, relay $K_2$, and lead 30 to the B plus source. And when upper contact 27 of relay $K_1$ is engaged, relay $K_3$ is energized by a circuit from the E plus source through resistor $R_3$, pole 26, contact 27, lead 29, relay $K_3$, and lead 30 to the B plus source.

Regardless of which contact 27 or 28 of relay $K_1$ is engaged, one of the relays $K_2$ or $K_3$ is energized; and error-voltage $E_e$ will be discharged to zero either through pole 31 and contact 37 of relay $K_2$ or through pole 41 and contact 47 of relay $K_3$. When short-circuiting occurs, condenser $C_1$ almost instantaneously discharges to voltage $E_r$ through the very small resistance of the portion of resistor $R_2$, that provides voltage $E_r$, because they provide a very small time-constant.

Hence, as soon as a short-circuit occurs at the input to direct-current amplifier 21, its output drops to zero; and relay $K_1$ is de-energized to, therefore, open the circuit of whichever relay, $K_2$ or $K_3$, was energized, this removing the short-circuit at the input terminals of the amplifier 21.

Integrator circuit 16 then begins to charge toward the steady-state error voltage $E_e$. The rate-of-charge for integrator circuit 16 will be a function of the steady-state error-voltage that exists at the particular instant. The rate-of-charge characteristic of integrator circuit 16 is illustrated in Figure 3 by a series of curves 64 through 69. Each curve represents the exponential rise of voltage in R–C integrator circuit 16, wherein each curve asymptotically approaches a different value of steady-state error-voltage $E_e$.

If error voltage $E_e$ is zero, no charging will occur in integrator circuit 16; and the rise-curve may be represented by abscissa $E_{eo}$ in Figure 3.

When the error-voltage $E_e$ is positive and has a small value, it might provide a rise-curve 66. If error-voltage $E_e$ is much more positive, it might, for example, provide a rise-curve 64. On the other hand, when the error-voltage is negative, the rise-curve will be negative and may be represented by any of the curves 67, 68 and 69, depending upon the value of error-voltage $E_e$.

However, the charging of integrator circuit 16 is never permitted in the invention to reach the steady-state error voltage $E_e$, unless it is substantially zero. When a substantial error-voltage of either positive or negative polarity exists, the rising voltage soon reaches a predetermined value $E_L$ or $-E_L$ which is required to actuate relay $K_1$. Relay actuating voltage $E_L$ is required to close lower contact 28 of relay $K_1$; and negative actuating voltage $-E_L$ is required to close upper contact 27. The required actuating voltage $E_L$ is dependent upon the gain of direct-current amplifier 21 and decreases as amplifier gain increases, because the final actuating voltage required at the input terminals of relay $K_1$ is relatively constant.

Figure 3 illustrates the relationship of the relay actuating voltages $E_L$ and $-E_L$ to the rise-curves. The instant of a short-circuiting is indicated in Figure 3 at zero time.

It can be seen from Figure 3 that, after a short-circuiting, the time required to actuate relay $K_1$ varies with the initial slope of the rise curves. The time between actuations is determined in Figure 3 by the time interval between zero and the point where the rise-curve intersects the relay actuating voltage $E_L$ or $-E_L$. Thus, the time interval between short-circuiting relay actuations becomes smaller as the initial slope of the rise-curves increases, which increases as the steady-state error-voltage $E_e$ increases. Various time intervals are illustrated by points 71, 72 and 73. Hence, it can be seen that the interval of time between momentary short-circuits is a function of the steady-state error-voltage $E_e$. For example, the intervals between short-circuits become longer as the magnitude of error-voltage $E_e$ becomes smaller.

It will now be described how the rate controlled time intervals are used to provide the feedback voltage $E_f$.

It is noted that capacitors $C_4$ and $C_5$ may be charged to the value of source voltage, H plus, when relay $K_2$ is not energized. Similarly, capacitors $C_6$ and $C_7$ may be charged to the value of source voltage, H minus, when relay $K_3$ is not energized.

However, when a negative error-voltage occurs to momentarily actuate relay $K_2$, pole 32 engages contact 38 and discharges capacitor $C_5$ into capacitor $C_f$ instantaneously, because there are no resistors in series with the capacitors; and the discharge is completed before relay $K_2$ can be disengaged. The increased feedback voltage $E_f$ on capacitor $C_f$ will decrease the error voltage $E_e$ toward the zero error-voltage state. Also, pole 33 engages contact 39, and capacitor $C_4$ acquires a voltage equal to the B plus source.

However, the error-voltage still may be far from zero. Accordingly, relay $K_1$ is very soon actuated again to reactuate relay $K_2$ according to the initial slope of the particular rise-curve as explained in connection with Figure 3. At the beginning of the interval of time between actuations of relay $K_2$, capacitor $C_4$ discharges into capacitor $C_5$ to bring their voltages to a value only slightly less than the B plus value, since capacitor $C_5$ is much smaller than capacitor $C_4$. During the remaining portion of the time interval, both capacitors $C_4$ and $C_5$ discharge through resistor $R_4$, since the H plus source is much smaller than the B plus source. For example, the B plus source might be 250 volts, while the H plus source might be 50 volts.

The combined capacitors $C_4$ and $C_5$ with resistor $R_4$ have a large time-constant, and the discharge of the capacitors occurs at a relatively slow rate. Thus, when the next relay actuation occurs, capacitor $C_5$ will be at an intermediate value between voltages B plus and H plus, according to the length of the time interval; and this intermediate voltage will be discharged into capacitor $C_f$ to bring the error-voltage closer to zero by another step.

However, when the error-voltage becomes very close to zero, it can be noted from Figure 3 that the time intervals between relay actuations become relatively long; and, consequently, capacitor $C_5$ has had time to discharge to the relatively low level of source, H plus. As a result, a relatively small charge is then dumped from $C_5$ into capacitor $C_f$; and the error voltage is changed by only an extremely small amount.

It is now apparent that the change of error-voltage toward the zero state is caused by a feedback voltage which has a stepped characteristic. The steps have varying time duration and varying voltage changes, as may be seen in Figure 4. A large voltage change occurs for a step when the error-voltage is large and is accompanied by a relatively short time duration. On the other hand, a small voltage change occurs for a step when the error-voltage is small and is accompanied by a relatively long time duration. This is illustrated in Figure 4, where stepped curve 76 is representative of the variation in feedback voltage $E_f$ across capacitor $C_f$ as a zero error-voltage state is reached. Curve 76 approaches a value 77 which will provide a zero error-voltage. Actually, the steps are relatively small in time duration, and the voltage change per step is also relatively small, so that broken line 76 in Figure 4 tends to approach a smooth curve which asymptotically approaches the required feedback voltage 77, and, therefore, cannot over-shoot to cause hunting and oscillation.

The operation of the other relay $K_3$ is exactly identical to relay $K_2$, except that capacitor $C_7$ is charged to a negative voltage; and it discharges into capacitor $C_f$ a voltage of opposite polarity from capacitor $C_5$. In other words, a positive error-voltage $E_e$ actuates relay $K_3$ to change the feedback voltage $E_f$ in one direction, while a negative error-voltage $E_e$ actuates relay $K_2$ to vary the feedback voltage $E_f$ in the opposite direction; and both relays operate to restore a zero error-voltage in the system.

It is, therefore, apparent that the invention provides a servo system that utilizes an electrical feedback which has a stepped characteristic that avoids over-shoot, oscillation, and hunting in the servo system and maintains the voltage across the integrator circuit substantially at the constant value determined by the setting of tap 18.

Where the invention is utilized, for example, in a circuit that maintains a constant pulse-repetition-rate, rather than in the above described amplitude distribution analyzer; threshold circuit 11 and electronic switch 13, described above, would not be used, but rather would be replaced by a circuit which would receive feedback voltage $E_t$ in a manner that will permit it to control the pulse-repetition-rate.

While a particular form of the invention has been shown and described, it is to be understood that the invention is capable of many modifications. Changes, therefore, in construction and arrangement may be made without departing from the full intended scope of the invention as given by the appended claims.

What is claimed is:

1. Servo means having a stepped electrical feedback voltage for regulating an electrical wave comprising, means having a feedback input and an output for regulating said wave in response to said feedback voltage to provide a regulated output wave having a direct-current component, a feedback capacitor connected across the feedback input to said wave regulating means, a low-pass filter connected serially to the output of said wave regulating means, a direct-voltage means connected serially with said low-pass filter and providing a voltage having opposite polarity from the regulated output, wherein an error-voltage is provided by the difference between the charged voltage of said low-pass filter and the voltage of said direct-voltage means, positive feedback controlling relay means, negative feedback controlling relay means, means for actuating said positive and negative feedback controlling relay means in response to positive and negative polarities of said error voltage respectively, means included in each of said relay means for short-circuiting said error-voltage when one of said relay means is actuated, a positive feedback controlling capacitor connected serially with said feedback capacitor by actuation of said positive feedback controlling relay means, a negative feedback controlling capacitor connected serially to said feedback capacitor by actuation of said negative feedback controlling relay means, means for charging said positive feedback controlling capacitor to a maximum value of positive direct-voltage by deactivation of said positive relay means, means for discharging said positive feedback controlling capacitor into said feedback capacitor by activation of said positive relay means, means for charging said negative feedback controlling capacitor to a maximum value of negative direct-voltage by deactivation of said negative relay means, and means for discharging said negative feedback controlling capacitor into said feedback capacitor by activation of said negative relay means.

2. Servo means for regulating a pulsed wave with a stepped type of feedback voltage comprising, wave-regulating means for regulating said pulsed wave and providing output pulses in response to said feedback voltage, integrator means for receiving the pulsed output of said wave-regulating means, control means connected serially to said integrating means to provide a direct-voltage having a polarity opposite from the polarity of the output pulses of said wave regulating means, direct-current amplifier having its input connected across said integrating means and control means to receive their difference voltage, a positive feedback regulating relay means, and a negative feedback regulating relay means, means connected between said positive and negative relay means and the output of said direct-current amplifier to actuate said feedback relay means respectively in response to the input polarity to said direct-current amplifier, means for short-circuiting the input to said direct-current amplifier in response to actuation of one of said feedback relay means, a positive feedback controlling capacitor connected in series with said feedback capacitor by actuation of said positive relay means, a negative feedback controlling capacitor connected in series with said feedback capacitor by actuation of said negative relay means, means for positively charging said positive feedback controlling capacitor by the deactivated condition of said positive relay, and means for negatively charging said negative feedback controlling capacitor by the deactivated condition of said negative relay.

3. Stepped-electrical-feedback servo means for regulating the output of a pulse-forming circuit having an output and a feedback input comprising, an integrator circuit connected to the output of said pulse-forming circuit, a direct-voltage control source connected serially with said integrator circuit and having a polarity opposite to the polarity of the output pulses of said pulse-forming circuit, a direct-current amplifier having its input connected across said integrator circuit and control source and having an output, a polarized relay including single-pole double-throw contacts and connected to the output of said direct-current amplifier, first and second feedback relays connected respectively to the contacts of said polarized relay, means for short-circuiting the input of said direct-current amplifier in response to actuation of said polarized relay, each of said first and second feedback relays including a pair of poles each actuating double-throw contacts, one being normally closed and the other being normally open, a feedback capacitor connected on one side to ground and on the other side to the feedback input of said pulse-forming circuit to provide the feedback voltage, said first and second feedback relays each having one of their normally-open contacts connected to the ungrounded side of said feedback capacitor, a positive direct-voltage source connected to the other normally-open contact of said first feedback relay, a negative direct-voltage source connected to the other normally-open contact of said second feedback relay, a positive control capacitor connected between ground and the first pole of said first feedback relay, a negative control capacitor connected between ground and the first pole of said second feedback relay, a positive storage capacitor connected between ground and the other pole of said first feedback relay, a negative storage capacitor connected between ground and the other pole of said second feedback relay, a pair of opposite potential sources, a first discharge resistor connected at one end to one of said potential sources and at its other end to both normally-closed contacts of said first feedback relay, a second discharge resistor connected at one end to said other potential source and at its other end to both normally-closed contacts of said second feedback relay, whereby the feedback voltage across said feedback capacitor is regulated in a stepped manner to maintain the output of said pulse forming circuit at a value determined by the setting of said controlling direct-voltage source.

4. Means for controlling the pulse-repetition-rate of a pulsed wave by a feedback voltage comprising, pulse-forming means, having a feedback connection; a feedback capacitor connected between ground and said feedback connection, a low-pass filter, and a pulse controlling direct-voltage means connected serially across the output of said pulse-forming circuit to provide a difference error-voltage, positive feedback control relay means, negative feedback control relay means, means for actuating said positive control relay means in response to an error-voltage having one polarity and for actuating said negative control relay means in response to an error-voltage having an opposite polarity, each of said feedback control relay means including contacting means for short-circuiting said low-pass filter and controlling voltage means, said short circuit occurring by energization of either of said relay means, a first control capacitor connected serially to said feedback capacitor by energization of said positive control relay means, a second control capacitor connected serially to said feedback capacitor by energization of said negative feedback control relay means, means for charging said first control capacitor to a first given level by the initial de-energization of said positive control relay means, means for discharging said first control capacitor to a lower level by the de-energization of said positive control relay means, means for charging said second control capacitor to a second given voltage level by the initial de-energization of said negative control relay means, and means for discharging said second control capacitor to a lower level by the de-energization of said negative control relay means.

5. Stepped-electrical-feedback servo means for controlling the pulsed output of a pulse-regulating circuit having a feedback input, comprising an integrator circuit connected to the output of said pulse regulating circuit, controlling direct-voltage means connected serially with said integrator circuit and providing a direct voltage having a polarity opposite the polarity of the pulses received by said integrator circuit, direct-current amplifying means having connected in series across its input said integrator circuit and said controlling voltage means, positive-feedback-relay means, negative-feedback-relay means, means connected to the output of said direct-current amplifying means to provide alternate actuation of said feedback relay means by opposite polarity input voltages to said amplifying means, means for short-circuiting the input to said amplifying means in response to said actuation of one of said feedback-relay means, each relay means having at least double-pole double-throw contacts, a feedback capacitor connected between ground and the feedback input to said pulse-regulating circuit, one of the normally-open contacts of each feedback-relay means connected to the ungrounded side of said feedback capacitor, a pair of feedback-control capacitors connected between ground and the respective first pole of each of said feedback-relay means, a pair of storage capacitors connected respectively between ground and each of the second poles of said feedback-relay means, a first positive direct-voltage source connected to the other normally-open contact of said first feedback-relay means, a first negative direct-voltage source connected to the other normally-open contact of said second feedback-relay means, and each of said feedback-relay means having both of their normally-closed contacts connected together.

6. Stepped-electrical-feedback servo means for an amplitude distribution analyzer comprising, threshold-circuit means having a feedback input for regulating the threshold level of said analyzer in response to the electrical feedback, switching means with an input and an output for providing output pulses controlled by said threshold-circuit means, said switching means having its input connected to the output of said threshold circuit means and providing output pulses having a constant amplitude; error-voltage determining means comprising, an integrator means, and a direct-voltage means connected serially across the output of said switching means; said direct-voltage means having a polarity opposite from the polarity of said pulses received by said integrator means, direct-current amplifying means having its input connected to said error-voltage determining means, a polarized-relay connected to the output of said direct-current amplifying means, said polarized-relay having at least single-pole double-throw contacts which are respectively engaged according to the polarity of the error-voltage, a positive-feedback-controlling relay having at least three poles, a negative-feedback-controlling relay having at least three poles, a direct-voltage source connected respectively in series with said positive and negative relays through opposing contacts of said polarized relay, the positive and negative relays each having its first pole and engaging normally-open contact connected to opposite sides of the input to said direct-current amplifying means, a feedback capacitor connected between ground and the feedback input to said threshold-circuit means, said positive and negative-feedback-controlling relays each having its second normally-open contact connected to the ungrounded side of said feedback capacitor, a pair of feedback-controlling capacitors connected respectively between ground and the second poles of said positive and negative relays, a pair of storage capacitors connected respectively between ground and the third poles of said positive and negative relays, a positive direct-voltage source connected to the third normally-open contact of said positive relay, a negative direct-voltage source connected to the third normally-open contact of said negative relay, a positive direct-voltage discharging source, a negative direct-voltage discharging source, a first discharging resistor connected at one end to said positive discharging source and connected at its other end to the second and third normally-closed contacts of said positive relay, a second discharging resistor connected at one end to said negative discharging source and connected at its other end to the second and third normally-closed contacts of said negative relay.

7. Electrical servo means for an amplitude distribution analyzer for determining the fraction-of-time that an input signal exceeds a given threshold-voltage level, comprising threshold-circuit means for determining said threshold level by regulating the direct-voltage component of said input signal by feedback, said threshold-circuit means having an output and a feedback input, electronic-switching means for forming pulses having a constant amplitude and having its input connected to the output of said threshold-circuit means, said electronic-switching means providing a pulse at its output for each period that the input signal exceeds the threshold level, an integrator circuit comprising a capacitor and a resistor connected in parallel, first and second direct-voltage sources, a potentiometer connected between said first and second direct-voltage sources, said integrator circuit connected between the output of said electronic-switching means and the tap of said potentiometer, the potentiometer providing a voltage having opposite polarity from the pulses received by said integrator circuit, direct-current amplifier means having its input connected across said integrator circuit and potentiometer, a polarized relay connected to the output of said direct-current amplifier, said polarized relay including a single-pole and double-throw contacts, in which one contact is engaged when said direct-current amplifier receives an input signal having one polarity, and the other contact is engaged when the direct-current amplifier receives an input signal having opposite polarity, a third source of direct voltage connected serially with the pole of said polarized relay, a first feedback-controlling relay connected between one contact of said polarized relay and one of said first and second voltage sources, a second feedback controlling relay connected between the other contact of said polarized relay and one of said first and second voltage sources, each of said feedback-controlling relays having at least three poles, each feedback-controlling relay having its first pole connected to one side of the input to said direct-current amplifier, each relay having a normally-open contact engaging its first pole and connected to the other side of the input to said direct-current amplifier, a pair of feedback-controlling capacitors connected respectively between ground and the second poles of said feedback-controlling relays, a pair of storage capacitors connected respectively between ground and the third poles of said feedback controlling relays, a feedback capacitor connected between ground and the feedback input to said threshold-circuit means to provide the feedback voltage of said servo system, the normally-open contact associated with the second pole of each feedback-controlling relay being connected to the ungrounded side of said feedback capacitor, the normally-open contact associated with the third pole of one of said feedback-controlling relays connected to any of said prior named direct-voltage sources, a third direct-voltage source having a polarity opposite the last-named source connected to the normally-open contact of the third pole of said other feedback-controlling relay, a fourth direct-voltage source having the same polarity but a smaller magnitude than said third source, a fifth direct voltage source having opposite polarity from said fourth source but a smaller magnitude than said first and second sources, a first discharging resistor connected at one end to said fourth source and connected at its other end to the respective normally-closed contacts engaging the second and third poles of the one feedback-controlling relay, a second discharging resistor connected at one end to said fifth source and connected at its other end to the normally-closed contacts respectively engaging the second and third poles of the other feedback-controlling relay.

References Cited in the file of this patent

UNITED STATES PATENTS

| | | |
|---|---|---|
| 2,075,604 | Finch | Mar. 20, 1937 |
| 2,496,337 | De Boisblanc | Feb. 7, 1950 |
| 2,499,953 | Herzog | Mar. 7, 1950 |
| 2,570,233 | Harris | Oct. 9, 1951 |